US012576718B2

(12) United States Patent
Brewer

(10) Patent No.: US 12,576,718 B2
(45) Date of Patent: Mar. 17, 2026

(54) DISPLAY SYSTEM FOR A VEHICLE

(71) Applicant: Honda Motor Co., Ltd., Tokyo (JP)

(72) Inventor: David J. Brewer, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 17/972,447

(22) Filed: Oct. 24, 2022

(65) Prior Publication Data

US 2024/0131933 A1    Apr. 25, 2024
US 2024/0227561 A9    Jul. 11, 2024

(51) Int. Cl.
| | |
|---|---|
| *B60K 35/60* | (2024.01) |
| *B60K 35/21* | (2024.01) |
| *B60K 35/215* | (2024.01) |
| *B60K 35/22* | (2024.01) |
| *B60K 35/23* | (2024.01) |
| *G02B 27/01* | (2006.01) |

(52) U.S. Cl.
CPC .......... *B60K 35/60* (2024.01); *G02B 27/0101* (2013.01); *B60K 35/213* (2024.01); *B60K 35/215* (2024.01); *B60K 35/22* (2024.01); *B60K 35/23* (2024.01); *B60K 2360/1523* (2024.01); *B60Y 2200/11* (2013.01); *G02B 2027/0141* (2013.01)

(58) Field of Classification Search
CPC ..... G02B 27/00–648; G02B 2027/0105–0198; B60K 2370/00; B60K 2360/00–96; B60K 35/00–90
See application file for complete search history.

(56) References Cited

U.S. PATENT DOCUMENTS

| | | | |
|---|---|---|---|
| 9,651,779 B2 | 5/2017 | Takasu et al. | |
| 10,872,586 B2 | 12/2020 | Koyama | |
| 11,085,947 B2 | 8/2021 | Nagata | |
| 2011/0175798 A1* | 7/2011 | Sato | B60K 35/00 345/7 |
| 2013/0027781 A1* | 1/2013 | Eckardt | G02B 27/01 359/630 |
| 2014/0125085 A1 | 5/2014 | Wakibayashi et al. | |

(Continued)

FOREIGN PATENT DOCUMENTS

| | | |
|---|---|---|
| CN | 210051963 U | 2/2020 |
| CN | 213619352 U | 7/2021 |

(Continued)

*Primary Examiner* — Christopher A Lamb, II
(74) *Attorney, Agent, or Firm* — Andrew Kefalonitis, Jr.; American Honda Motor Co., Inc.

(57) ABSTRACT

A display system for a vehicle to display vehicle information includes a meter panel, a heads-up display system, and a controller. The meter panel has at least one display section and the heads-up display system includes a projector mounted on the meter panel and arranged at a front of the meter panel opposite to the at least one display section. The projector is configured to project a light to display the vehicle information on the front windshield. The heads-up display system also includes a curve mirror arranged spaced apart from the projector and is adapted to reflect and focus the light on the front windshield to display the vehicle information on the front windshield. The controller is configured to control the meter panel and heads-up display system to display the vehicle information on the meter panel and the front windshield.

12 Claims, 5 Drawing Sheets

(56)                    References Cited

U.S. PATENT DOCUMENTS

| | | | |
|---|---|---|---|
| 2015/0123878 A1* | 5/2015 | Kawasaki ............ | B60K 35/232 |
| | | | 345/7 |
| 2017/0246956 A1* | 8/2017 | Hall ........................ | B60K 35/23 |
| 2018/0190242 A1* | 7/2018 | Fujita ....................... | H04N 5/74 |
| 2019/0049723 A1* | 2/2019 | Qin .................... | G01G 23/3728 |
| 2020/0225472 A1 | 7/2020 | Aoki | |

FOREIGN PATENT DOCUMENTS

| | | | |
|---|---|---|---|
| JP | 4008252 | B2 | 11/2007 |
| JP | 6229547 | B2 | 11/2017 |
| WO | 202090221 | A1 | 5/2020 |

* cited by examiner

DISPLAY SYSTEM FOR A VEHICLE

BACKGROUND

The disclosed subject matter relates generally to a display system for a vehicle. More particularly, the disclosed subject matter relates to a display system having a heads-up display for a vehicle.

Heads-up displays may be installed in vehicles to display information to a driver of the vehicle during travel of the vehicle. A typical heads-up display system 10, shown in FIG. 1, is arranged inside the vehicle, and more specifically, at least partially below a dashboard 11, also referred to as an instrument panel, of the vehicle. The heads-up display system 10 typically includes a projector 12 having a display panel 14, for example, a liquid crystal display 16, with a screen that displays or shows an image and a fold mirror 18 arranged at a distance from the display panel 14 to reflect a light, corresponding to the image shown on the screen, received from the display panel 14. The fold mirror 18 is oriented relative to the display panel 14 such that the light received from the display panel 14 is reflected towards a curve mirror 20. The curve mirror 20 reflects and focuses the light received from the fold mirror 18 to a front windshield (not shown in FIG. 1) arranged outside the dashboard 11. A virtual image of the image formed on the screen of the display panel 14 is formed on the front windshield in a line-of-sight of the driver. The fold mirror 18 is generally used to increase or provide an optimal optical distance between the display panel 14 and the curve mirror 20.

Typically, the display panel 14, the fold mirror, and the curve mirror 20 are arranged inside the dashboard 11 of the vehicle, and occupy a relatively large physical volume within the dashboard 11 or the instrument panel, which is undesirable and sometimes limits the possibility of installing the head-up display system 10 in the vehicle due to space constraints.

SUMMARY

In accordance with one embodiment of the present disclosure, a display system for a vehicle to display vehicle information is provided. The display system includes a meter panel having at least one display section to show the vehicle information, and a heads-up display system configured to display the vehicle information on a front windshield of the vehicle. The heads-up display system includes a projector mounted on the meter panel and arranged at a front of the meter panel opposite to the at least one display section. The projector is configured to project a light to display the vehicle information on the front windshield. The heads-up display system also includes a curve mirror arranged spaced apart from the projector to reflect and focus the light received from the projector on the front windshield to display the vehicle information on the front windshield. The display system also includes a controller configured to control the meter panel and the heads-up display system to display the vehicle information on the at least one display section of the meter panel and the front windshield.

In accordance with another embodiment of the present disclosure, a vehicle is provided. The vehicle includes a vehicle body defining a passenger compartment, and a front windshield mounted to the vehicle body. The vehicle also includes a dashboard extending inside the passenger compartment from a lower end of the front windshield, and a meter panel arranged at least partially inside the dashboard and including at least one display section arranged at a first end of the meter panel. Moreover, the vehicle includes a heads-up display system arranged at least partially inside the dashboard and including a projector mounted on the meter panel and arranged at a second end of the meter panel opposite to the at least one display section. The projector is configured to project a light to display vehicle information on the front windshield. The heads-up display system also includes a curve mirror arranged spaced apart from the projector to reflect and focus the light received from the projector on the front windshield to display the vehicle information on the front windshield. The vehicle also includes a controller configured to control the meter panel and the heads-up display system to display the vehicle information on the at least one display section of the meter panel and the front windshield.

In accordance with yet a further embodiment of the present disclosure, a display system for a vehicle to display vehicle information is provided. The display system includes a meter panel having at least one display section to show the vehicle information, and a heads-up display system configured to display the vehicle information on a front windshield of the vehicle. The heads-up display system includes a display panel mounted on the meter panel and arranged at a front of the meter panel opposite to the at least one display section. The display panel is adapted to display an image associated with the vehicle information. The heads-up display system also includes a curve mirror arranged spaced apart from the display panel to receive the light associated with image displayed by the display panel. The curve mirror is adapted to reflect and focus the light on the front windshield to display the vehicle information on the front windshield. Moreover, the display system includes a controller configured to control the meter panel and the display panel to display the vehicle information on the at least one display section of the meter panel and the front windshield.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 2-5, wherein like numbers indicate the same or corresponding elements throughout the views.

Figure 1:
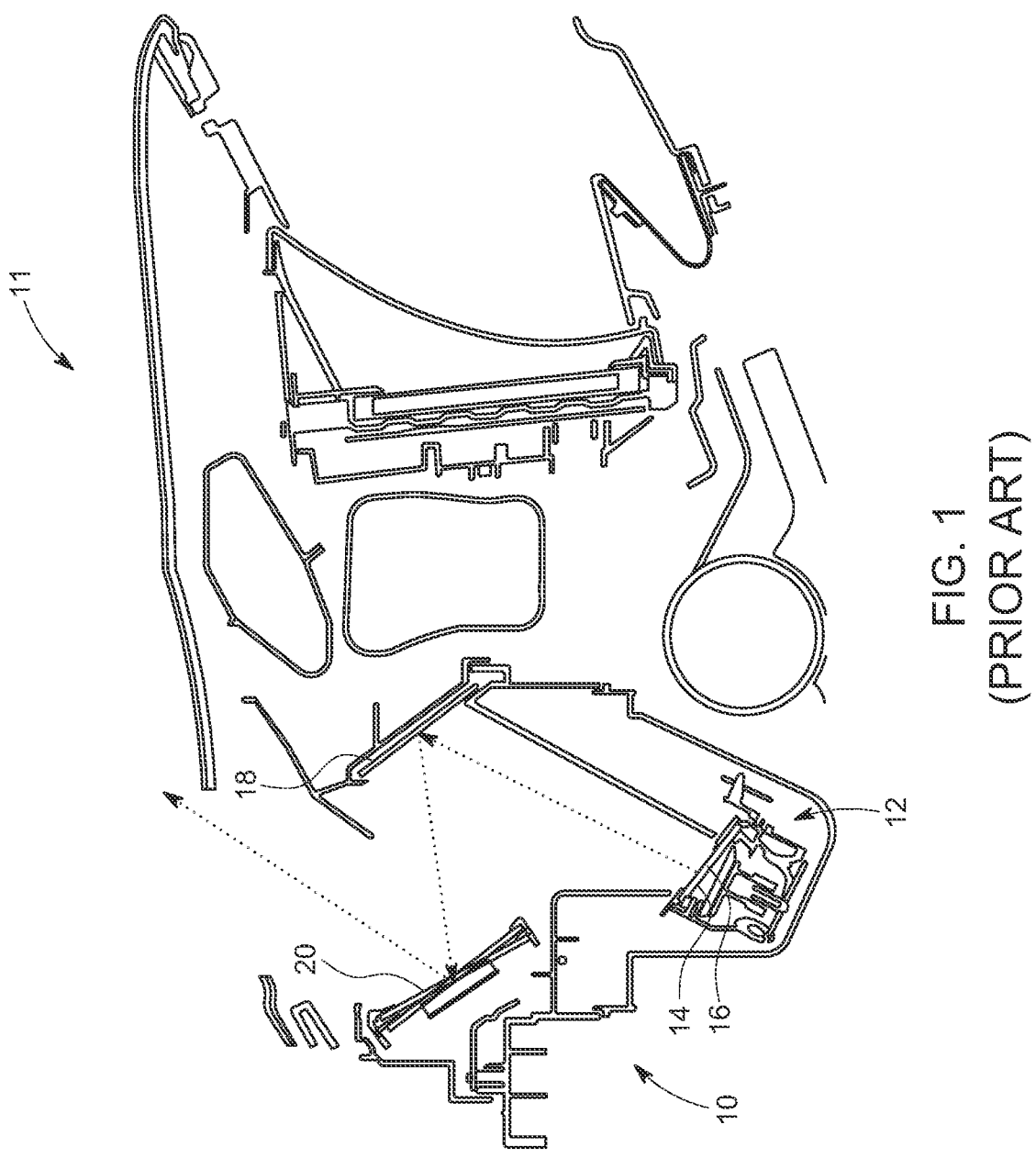
FIG. 1 is a schematic view of a heads-up display system arranged inside a vehicle as is known in the prior art.
Figure 2:
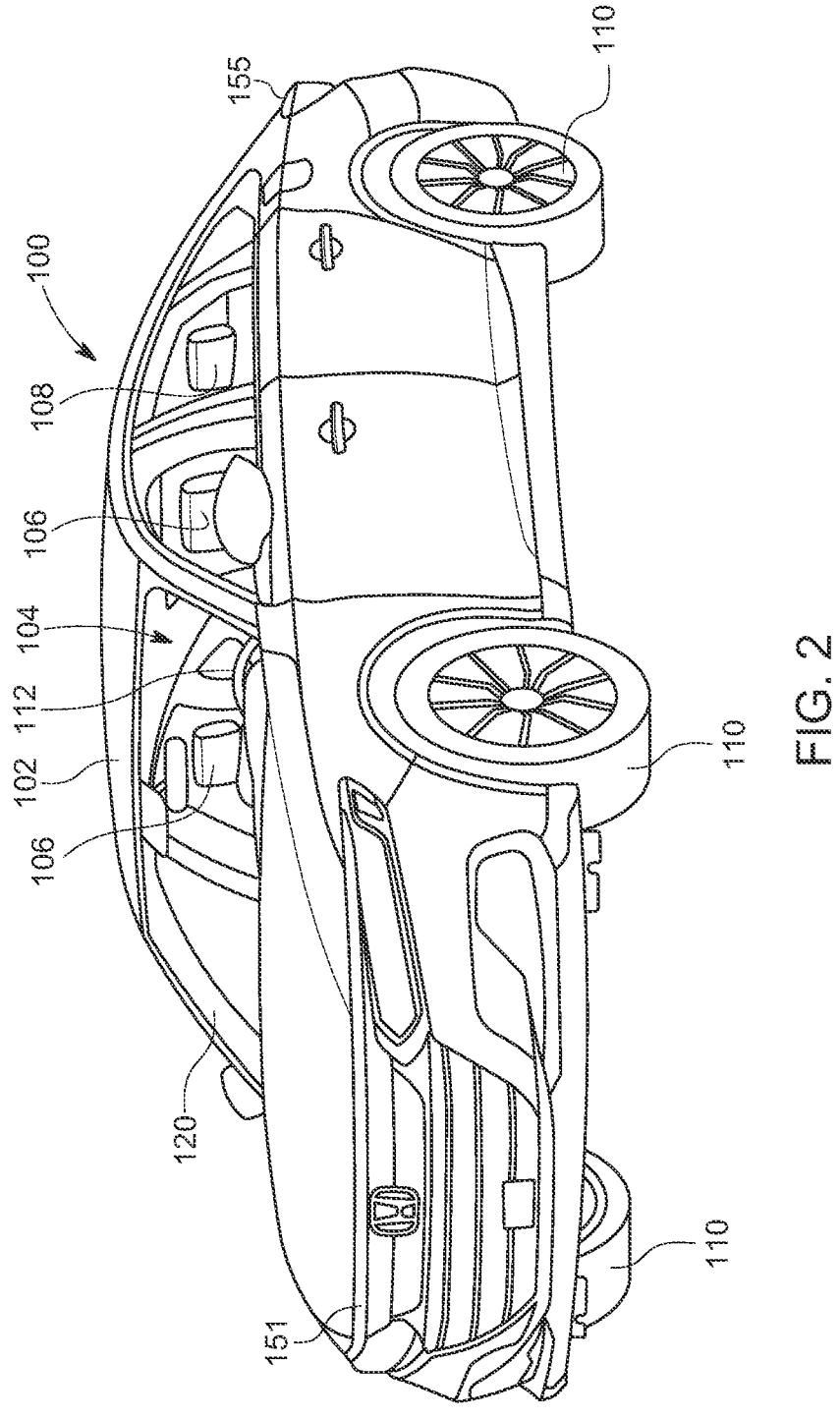
FIG. 2 is a perspective view of a vehicle having a front windshield, in accordance with at least one embodiment of the present disclosure.

FIG. 2 illustrates a perspective view of a vehicle, indicated generally at 100, in accordance with at least one embodiment of the present disclosure. The vehicle 100 is shown as a car, however, it may be appreciated that vehicle 100 may include any other mobility devices, for example, a truck, an all-terrain vehicle (ATV), sport utility vehicle (SUV), a multi-utility vehicle (MUV), and the like that allow the present disclosure to function as described herein. The vehicle 100 may include a vehicle body 102 defining a passenger compartment 104 having at least one front seat 106 and at least one rear seat 108 to facilitate a seating of one or more persons inside the vehicle 100. The vehicle 100 further includes a plurality of wheels 110, supporting the vehicle body 102 on a surface and enables a movement of the vehicle 100 on the surface. Moreover, the vehicle 100 includes a steering wheel 112 to facilitate a steering of the wheels 110 on the road and is operated or rotated by a driver of the vehicle 100. Additionally, the vehicle 100 includes a windshield, for example, a front windshield 120, arranged at a front of the vehicle 100, and extends from a bonnet of the body 102 to a roof the body 102. The front windshield 120 enables the driver to view the path and various other objects residing or moving on the path in front of the vehicle 100.

Figure 3:
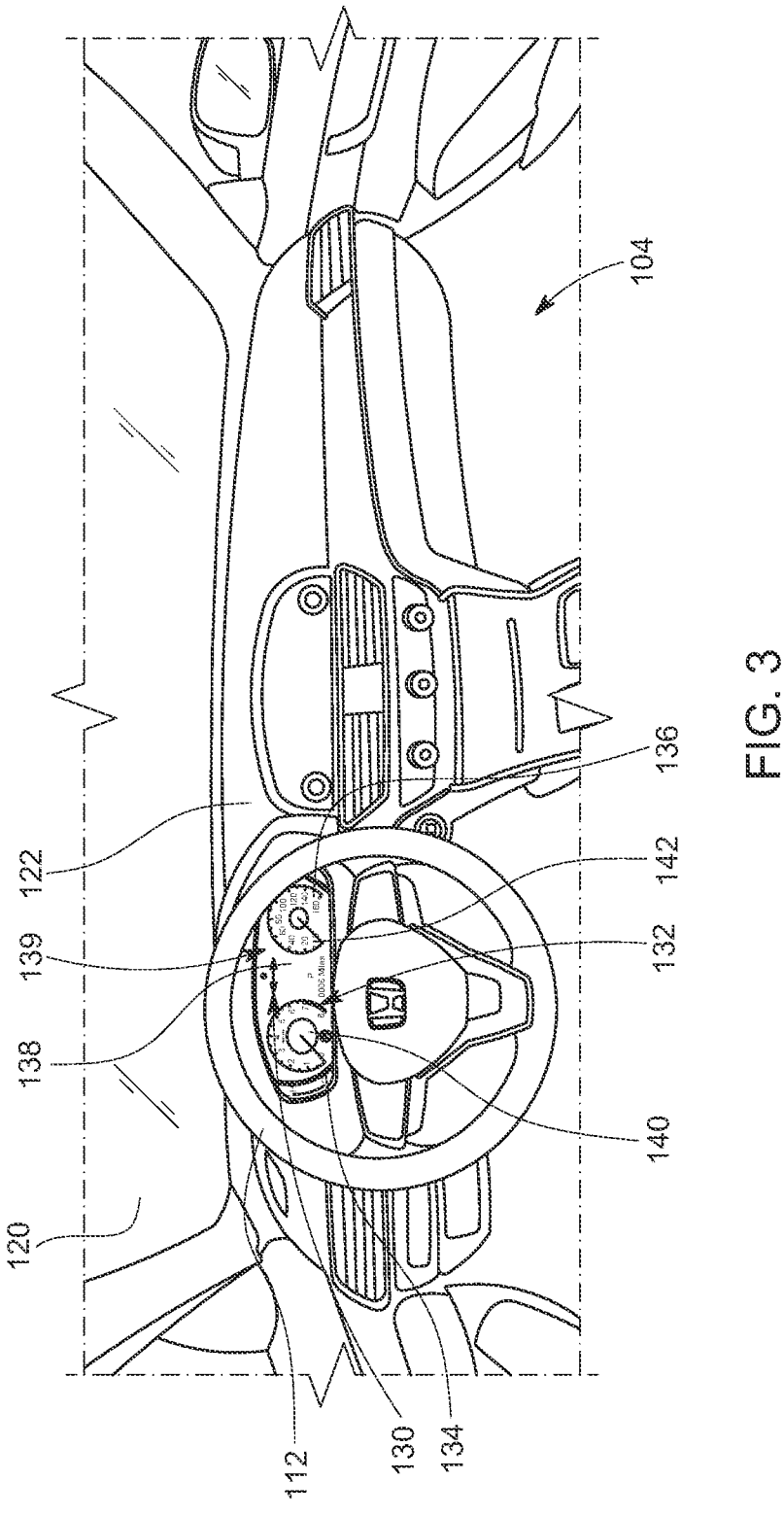
FIG. 3 is an enlarged view of a portion of an interior of the vehicle depicting a dashboard and a meter panel mounted on the dashboard of the vehicle, in accordance with at least one embodiment of the present disclosure.

Further, as shown in FIG. 3, the vehicle 100 includes a dashboard 122 arranged inside the vehicle 100 and extending rearwardly towards the front seat 106 of the vehicle 100 from a lower end of the front windshield 120. The dashboard 122 may be formed by molding a suitable plastic, and may house various components. The dashboard 122 may also include one or more storage compartments for storing one or more articles. The dashboard 122 also facilitates a mounting of a display system 130 of the vehicle 100 that displays vehicle information, for example, one or more operating parameters of the vehicle 100, a status warning associated with one or more systems or components of the vehicle 100, a navigation route, etc., to a driver of the vehicle 100.

Figure 4:
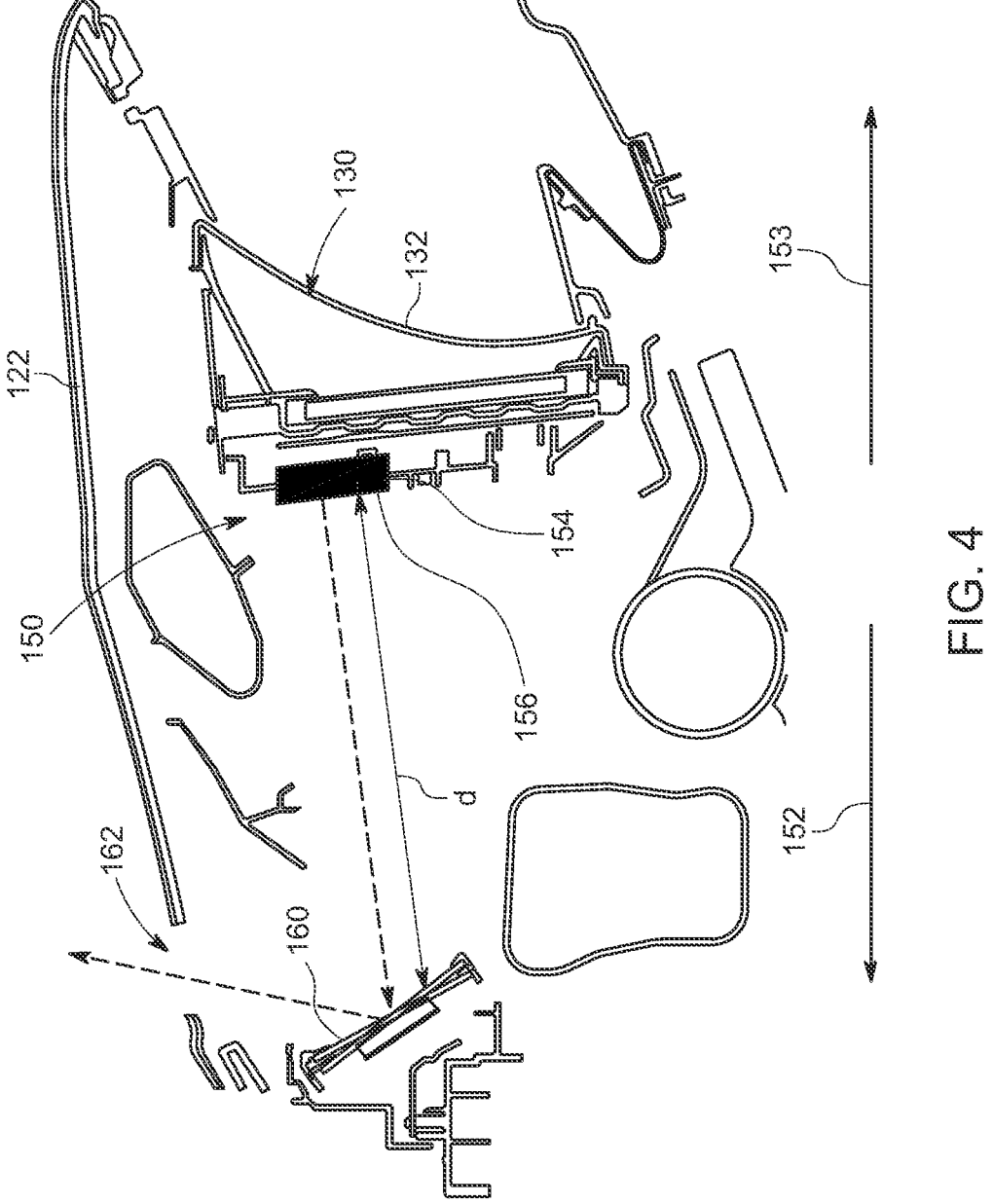
FIG. 4 is a schematic view of a display system with a heads-up display system arranged inside the dashboard of the vehicle, in accordance with at least one embodiment of the present disclosure.
Figure 5:
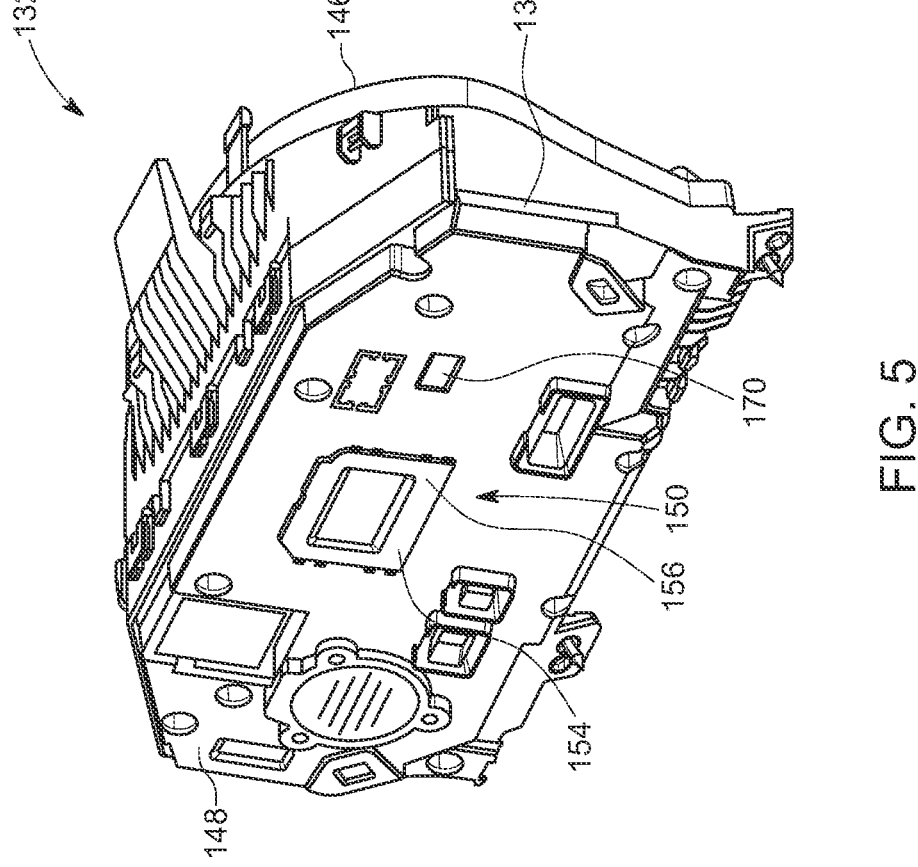
FIG. 5 is a view of the meter panel depicting a projector of the heads-up display system mounted on the meter panel, in accordance with at least one embodiment of the present disclosure.

Referring to FIGS. 3 to 5, the display system 130 includes a meter panel 132 having at least one display section, for example, a first display section 134, a second display section 136, and a third display section 138, to display vehicle information. The meter panel 132 is mounted inside the dashboard 122 such that the display sections 134, 136, 138 arranged at a rear end 146 (i.e., the first end 146) of the meter panel 132 are visible or extend outside the dashboard 122 through a suitable opening. As shown, the rear end 146 of the meter panel 132 is arranged facing the front seat 106 of the vehicle 100. In the illustrated embodiment, the meter panel 132 is a combi-meter 139 having the first display section 134 that acts as a tachometer 140 to display a rotation speed of a crankshaft of an engine of the vehicle 100, and the second display section 136 as a speedometer 142 to display a linear speed or travelling speed of the vehicle 100. Further, the third display section 138 that is arranged between the first display section 134 and the second display section 136 may display various other information related to an operation of the vehicle 100, for example, at least one warning light, an ambient temperature, an operating gear of the vehicle 100, a distance travelled by the vehicle 100, or any other such information of the vehicle.

Additionally, Referring to FIG. 4, the display system 130 includes a heads-up display system 150 having one more component integrated with the meter panel 132. As referred to herein, when a first component is described as being positioned forward of a second component, the first component is positioned closer to a front 151 of the vehicle 100 (see FIG. 2) than the second component. Forward arrow 152 points toward the front 151 of the vehicle 100 and rearward arrow 153 points toward a rear 155 (see FIG. 2) of the vehicle 100. The heads-up display system 150 is at least partially arranged inside the dashboard 122 at a location forward of the meter panel 132. The heads-up display system 150 includes a projector 154 configured to project light facilitating display of the vehicle information. In the illustrated embodiment the projector 154 is a display panel 156, for example, a liquid crystal display or an LED (light emitting diode) display panel, to show/display an image corresponding to the vehicle information on a screen of the display panel 156. Although the projector 154 is contemplated as the display panel 156, it may be appreciated that any other type of projector 154 that is configured to emit light to display the vehicle information can also be utilized. The heads-up display system 150 also includes a curve mirror 160 arranged inside the dashboard 122 and disposed forward of the projector 154 at a suitable distance 'd' from the projector 154. The curve mirror 160 is arranged to receive the light projected by the projector 154, and reflects such light toward the front windshield 120 through an opening 162 defined by an upper surface of the dashboard 122. The curve mirror 160 is oriented and arranged to focus the reflected light on the front windshield 120 to form an image visible to the driver. In an embodiment, the curve mirror 160 is arranged to receive the light associated with the image displayed on the screen of the display panel 156). In an embodiment, the curve mirror 160 is a concave mirror.

As shown in FIG. 4 and FIG. 5, the display panel 156 (i.e., the projector 154) is mounted on the meter panel 132 and is arranged at a forward end 148 (i.e., second end 148) of the meter panel 132 opposite to the display sections 134, 136, 138 of the meter panel. It may be appreciated that the meter panel 132 is mounted on the dashboard 122 such that the rear end 146 of the meter panel 132 is arranged distally to the front 151 of the vehicle 100 relative to the forward end 148 of the meter panel 132. Accordingly, the display panel 156 (i.e., the projector 154) is oriented such that the screen of the display panel 156 faces in a direction opposite to the screens of the display sections 134, 136, 138 of the meter panel 132.

In an embodiment, as shown in FIG. 4, the light reflected from the curve mirror 160 and after passing through the opening 162 forms the image. In an embodiment, the image may be a virtual image of an image projected by the display panel 156 (i.e., the projector 154) and is formed on the front windshield 120 of the vehicle 100. The image formed on the front windshield 120 is adapted to be visible to the driver sitting on the front seat 106. As the fold mirror is omitted from the heads-up display system 150, and the projector 154 (i.e., the display panel 156) is mounted on the meter panel 132, the heads-up display system 150 is of relatively smaller size as compared to the heads-up display 10 of the prior art, and is mounted in relatively small space inside the dashboard 122 relative to the prior heads-up displays 10. It may be appreciated that a distance 'd' between the projector 154 (i.e., the display panel 156) and the curve mirror 160 is selected such that the distance 'd' is equal to a desired optical distance between the projector 154 (i.e., the display panel 156) and the curve mirror 160 to enable a formation of the image on the front windshield 120. In at least one embodiment, the distance 'd' is between approximately 100 millimeters and 300 millimeters, and more specifically, between 190 millimeters and 220 millimeters.

Further, the display system 130 includes controller 170 (shown in FIG. 5) to control various components to the display system 130. The controller 170 may include a processor for executing specified instructions, which controls and monitors various functions associated with display system 130, and its components, for example, the meter panel 132, the heads-up display system 150, etc. The processor may be operatively connected to a memory for storing instructions related to the control of the display system 130 and components of the display system 130.

The memory may be integrated into the controller 170, but those skilled in the art will understand that the memory may be separate from the controller 170 but onboard the vehicle 100, and/or remote from the controller 170 and the vehicle 100, while still being associated with and accessible by the controller 170 to store information in and retrieve information from the memory as necessary during the operation of the display system 130. Although the processor is contemplated, it is also possible and contemplated to use other electronic components such as a microcontroller, an application specific integrated circuit (ASIC) chip, or any other integrated circuit device.

The controller 170 is adapted to control both the meter panel 132 and the heads-up display system 150 to display the vehicle information, for example, one or more parameters related to the driving and/or operation of the vehicle 100. The controller 170 is configured to receive information about one or more operating parameters of the vehicle 100 from a plurality of sensors of the vehicle 100 or ECU of the vehicle 100 or other controllers of various sub-systems of the vehicle 100, and displays the vehicle information via the display sections 134, 136, 128 of the meter panel 132 and/or heads-up display system 150. For example, the controller 170 may display the rotational speed of the engine (i.e., the crankshaft) via the tachometer 140. Also, the controller 170 may display a speed of the vehicle 100 via the speedometer 142 of the meter panel 132. In an embodiment, the controller 170 may display an operating gear of the vehicle 100 via the third display section 138 of the meter panel 132. Further, the controller 170 may control the heads-up display system 150 to display the vehicle information on the front windshield 120 that is also displayed by the meter panel 132. The vehicle information may be displayed in the same format on the meter panel 132 and the heads-up display system 150, or alternatively may be displayed in one format on the heads-up display system 150 and a different format on the meter panel 132.

The controller 170 may control the heads-up display system 150 (i.e., the projector 154) and the meter panel 132 to display different vehicular information. In an embodiment, a user may select the information to be displayed by the heads-up display system 150, and the controller 170 may control the projector 154 to display the user selected information on the front windshield 120. For example, a user may select a navigational route (information) from a source location to a destination location to be displayed by the heads-up display system 150. Accordingly, the controller 170 may display the desired navigation route to the driver on the front windshield 120 by controlling the heads-up display system 150. For so doing, the controller 170 may be in communication with a navigation module (not shown) that determines the route to the desired location. Further, as the front windshield 120 includes a curvature and is arranged at inclination relative to a vertical direction, the controller 170 may control the projector 154 and emits the light by taking into account the effect of the curvature of the windshield 120 and inclination of the windshield 120 such that the image (i.e., the virtual image) formed on the windshield 120 and as viewed by the driver is identical to an image formed on a flat surface.

Accordingly, the display system 130 utilizes the natural distance between the projector 154 and the curve mirror 160, integrating the control function of both the meter panel 132 and the heads-up display system 150 into a single controller 170, a cost of the display system 130 is significantly reduced.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle, comprising:
   a vehicle body defining a passenger compartment;
   a front windshield mounted to the vehicle body;
   a dashboard extending inside the passenger compartment from a lower end of the front windshield;
   a meter panel arranged at least partially within the dashboard and including a rear facing end and a forward facing end, the meter panel comprising:
      at least one display section positioned on the rear facing end and configured to directly display the vehicle information to a driver positioned rearward from the meter panel; and
      a projector positioned on the forward facing end, opposite to the rear facing end, and configured to emit light, and
   a curve mirror arranged spaced apart and forward from the projector to reflect and focus the light received from the projector on the front windshield to display the vehicle information as a virtual image on the front windshield; and
   a controller configured to control the at least one display section and the projector to simultaneously display the vehicle information on the at least one display section of the meter panel and the front windshield.

2. The vehicle of claim 1, wherein the projector includes at least one of a liquid crystal display panel and a light emitting diode display panel to display an image corresponding to the vehicle information.

3. The vehicle of claim 1, wherein a distance between the projector and the curve mirror corresponds to a desired optical distance between the projector and the curve mirror to enable a formation of the virtual image on the front windshield.

4. The vehicle of claim 3, wherein the distance between the projector and the curve mirror is between approximately 190 millimeters and 220 millimeters.

5. The vehicle of claim 1, wherein the vehicle information is displayed in a different format on the at least one display section of the meter panel than on the front windshield.

6. The vehicle of claim 1, wherein the meter panel is a combi-meter having a speedometer and a tachometer.

7. The vehicle of claim 1 wherein an opening is defined within the dashboard and the light reflected by the curve mirror is directed to the front windshield through the opening.

8. The vehicle of claim 1, wherein the curve mirror is a concave mirror.

9. A display system for a vehicle to display vehicle information, comprising:

a meter panel configured to be arranged at least partially within a vehicle dashboard and having a rear facing end and a forward facing end, the meter panel comprising:

at least one display section positioned on the rear facing end and configured to directly display the vehicle information to a driver positioned rearward from the meter panel; and a projector positioned on the forward facing end, opposite to the rear facing end, and configured to emit light toward a curve mirror positioned forward from the meter panel, the projector and curve mirror are included in a heads-up display system that displays a virtual image of the vehicle information on a front windshield of the vehicle; and a controller communicatively coupled to the meter panel and configured to control the at least one display section and the projector to simultaneously display the vehicle information on the at least one display section of the meter panel and the front windshield.

10. The display system of claim 9, wherein the projector includes at least one of a liquid crystal display and a light emitting diode display.

11. The display system of claim 9, wherein the vehicle information is displayed in a different format on the at least one display section than on the front windshield.

12. The display system of claim 9, wherein the meter panel is a combi-meter having a speedometer and a tachometer.

\* \* \* \* \*